(12) United States Patent
Wilde et al.

(10) Patent No.: US 11,781,756 B2
(45) Date of Patent: Oct. 10, 2023

(54) GAS GRILL AND CONTROL METHOD THEREOF

(71) Applicant: Otto Wilde Grillers GmbH, Düsseldorf (DE)

(72) Inventors: Nils Wilde, Düsseldorf (DE); Haotian Zhang, Düsseldorf (DE)

(73) Assignee: Otto Wilde Grillers GmbH

( * ) Notice: Subject to any disclaimer, the term of this patent is extended or adjusted under 35 U.S.C. 154(b) by 281 days.

(21) Appl. No.: 17/318,081

(22) Filed: May 12, 2021

(65) Prior Publication Data

US 2021/0356134 A1    Nov. 18, 2021

(30) Foreign Application Priority Data

May 12, 2020    (EP) .................................. 20174245

(51) Int. Cl.
*A47J 36/32*    (2006.01)
*F24C 3/12*    (2006.01)
*A47J 36/36*    (2006.01)
*A47J 37/07*    (2006.01)
*F23N 1/00*    (2006.01)
*G05D 23/19*    (2006.01)

(52) U.S. Cl.
CPC .............. *F24C 3/126* (2013.01); *A47J 36/32* (2013.01); *A47J 36/36* (2013.01); *A47J 37/0713* (2013.01); *F23N 1/005* (2013.01); *G05D 23/1917* (2013.01); *A47J 2202/00* (2013.01); *F23N 2235/16* (2020.01); *F23N 2235/22* (2020.01); *F23N 2235/24* (2020.01); *F23N 2237/02* (2020.01)

(58) Field of Classification Search
CPC .. F24C 3/126; A47J 36/32; A47J 36/36; A47J 37/0713; A47J 2202/00; F23N 1/005; F23N 2235/22; F23N 2235/16; F23N 2235/02; F23N 2235/24
USPC ....................................................... 126/39 G
See application file for complete search history.

(56) References Cited

U.S. PATENT DOCUMENTS 5,117,747 A * 6/1992 Kuechler ............ A47J 37/0682
126/41 R
5,676,043 A    10/1997 Best
(Continued)

FOREIGN PATENT DOCUMENTS

DE    102013018749 A1    5/2015

*Primary Examiner* — Avinash A Savani
(74) *Attorney, Agent, or Firm* — Harness, Dickey & Pierce, P.L.C.

(57) ABSTRACT

The disclosure relates to a gas grill and control method thereof. The gas grill comprises a housing defining a cooking chamber, a plurality of cooking zones in the cooking chamber, wherein each of the plurality of cooking zones is corresponding to at least one heating module, a gas supply module configured to provide gas to the at least one heating module of each of the plurality of cooking zones, a control module configured to control the gas supply module and the at least one heating module corresponding to each of the plurality of cooking zones based on a control input, and a user interface configured to generate the control input, wherein the control module is further configured to group at least two of the plurality of cooking zones to a cooking group based on the control input and control the heating modules corresponding to the cooking group based on the control input.

12 Claims, 13 Drawing Sheets

(56) References Cited

U.S. PATENT DOCUMENTS

| | | | |
|---|---|---|---|
| 9,810,436 B2 | 11/2017 | Mayberry et al. | |
| 10,485,379 B2 | 11/2019 | Bennett et al. | |
| 10,939,506 B2 * | 3/2021 | Jeanneteau | H05B 6/44 |
| 2002/0160325 A1 * | 10/2002 | Deng | F23N 5/14 |
| | | | 431/76 |
| 2010/0132692 A1 | 6/2010 | Shaffer | |
| 2016/0374510 A1 | 12/2016 | Albizuri Landazabal | |
| 2019/0166850 A1 * | 6/2019 | Bailie | A21B 1/36 |
| 2019/0246837 A1 | 8/2019 | Becker et al. | |
| 2019/0254125 A1 * | 8/2019 | Milanesi | H05B 6/065 |

* cited by examiner

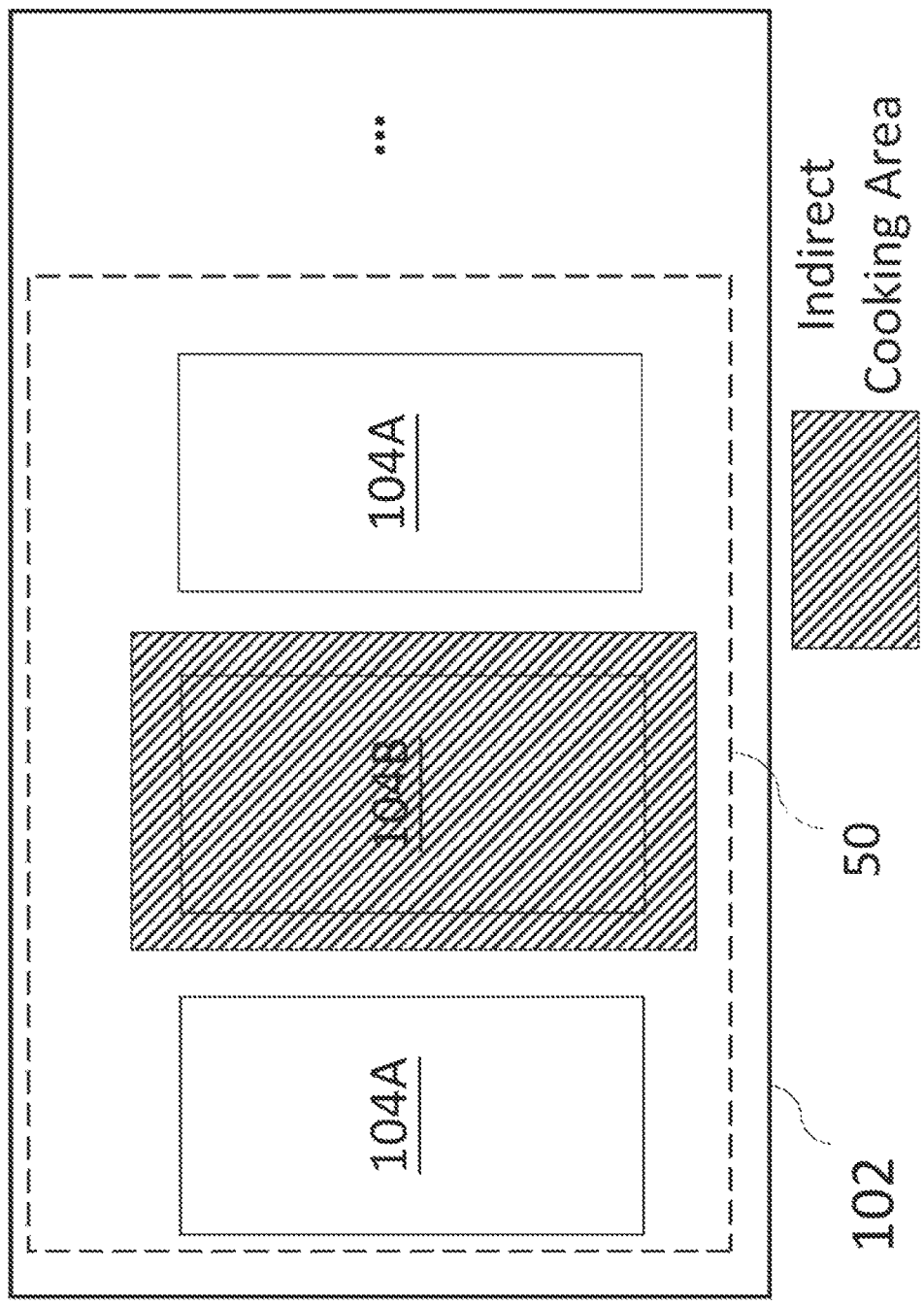

GAS GRILL AND CONTROL METHOD THEREOF

CROSS-REFERENCE TO RELATED APPLICATION

This application claims priority to European Application No. 20174245.9 filed May 12, 2020. The disclosure of the above application is incorporated herein by reference.

FIELD OF THE APPLICATION

The present application relates to a gas grill and control method thereof, and more particularly to a gas grill providing a grouping function and control method thereof.

BACKGROUND OF THE APPLICATION

Until today, grilling is one of the most popular cooking methods of all time. There are various types of grilling apparatus such as charcoal grills, gas grills or electric grills. In recent years, gas grills have become ubiquitous thanks to their high heat supply, convenience and readiness.

Typically, gas grills are operated using manual controls, which are housed in control panels mounted to the grill frame. The user regulates cooking temperature adjusting the flow of gas to the at least one burner, which is used to provide heat to the system.

Most state-of-the-art gas grills are powered by several burners, which allows for both, direct and indirect cooking. Direct cooking refers to cooking by means of radiation, while indirect cooking refers to cooking by means of convection, preferably blocking all radiation from the indirect cooking zone. To achieve this, food stuff is placed directly over an active burner when cooking directly, whereas for indirect cooking, food stuff is placed on an area of the cooking zone over inactive burners, with heat being supplied by an ancillary burner.

Change of cooking temperatures requires the user to change the gas flow to burners by means of manual dials mounted on the grill. This necessitates the user to be present at the grill throughout the cooking process. Also, when wanting to set up a zone with the same cooking temperature spreading across multiple burners or to set up and maintain a homogenous temperature in an indirect zone, the user is faced with a fiddly task, as setting temperature involves an iterative process which is highly sensitive to external factors, like outside temperature, wind conditions, etc.

SUMMARY

The present disclosure provides a gas grill with a grouping function and a control method thereof.

The present disclosure relates to a gas grill. The gas grill comprises:
 a housing defining a cooking chamber,
 a plurality of cooking zones in the cooking chamber, wherein each of the plurality of cooking zones is corresponding to at least one heating module,
 a gas supply module configured to provide gas to the at least one heating module of each of the plurality of cooking zones,
 a control module configured to control the gas supply module and the at least one heating module corresponding to each of the plurality of cooking zones based on a control input, and
 a user interface configured to generate the control input, wherein the control module is further configured to:
 group at least two of the plurality of cooking zones to a cooking group based on the control input, and
 control the heating modules corresponding to the cooking group based on the control input.

Various embodiments may implement the following features:

In an embodiment, the control module controls the heating modules corresponding to the cooking group based on the control input by controlling the heating modules corresponding to the cooking group based on a control loop indicated by the control input.

For example, the control module controls the heating modules corresponding to the cooking group based on the control input by:
 determining, based on the control input, at least one indirect heating zone from the cooking zones of the cooking group and at least one direct heating zone from the cooking zones of the cooking group, and
 controlling at least one temperature of the at least one indirect heating zone by controlling the heating module corresponding to the at least one direct heating zone based on a control loop indicated by the control input.

In another example, the control module controls the heating modules corresponding to the cooking group based on the control input by:
 determining, based on the control input, at least one direct heating zone from the cooking zones of the cooking group, and
 controlling at least one temperature of the at least one direct heating zone by controlling the heating module corresponding to the at least one direct heating zone based on a control loop indicated by the control input.

In some embodiments, the control module controls the heating modules corresponding to the cooking group based on the control input further by turning off the heating module corresponding to the at least one indirect heating zone.

The gas grill further comprises at least one heat deflector between the cooking zones of the cooking group, wherein the at least one heat deflector is configured to shield radiation heat from the at least one direct heating zone to the at least one indirect heating zone. In other words, the gas grill further comprises at least one heat deflector between the cooking zones of the cooking group, wherein the at least one heat deflector is configured to shield radiation heat emitted by the at least one direct heating zone.

In an embodiment, the control module is configured to group the at least two of the plurality of cooking zones as the cooking group based on a group pattern indicated by the control input.

The control module may be configured to determine the at least one indirect heating zone and/or the at least one direct heating zone based on a cooking pattern indicated by the control input.

The control module may also be configured to determine at least one of the group pattern or the cooking pattern based on the control input received from the user interface.

Each of the at least one heating module corresponding to the plurality of cooking zones comprises at least one of a burner, a heat distributor, a grill grate, a gas nozzle, a temperature sensor, a flame sensor, an ignitor and an electrical gas valve located between the gas nozzle and gas supply module.

In an embodiment, each of a plurality of heating modules comprises an electric gas valve and a temperature sensor.

In this embodiment, the control module is configured to control a control current for controlling each of the electric gas valves based on a measurement from the respective temperature sensor. For example, the control module is configured to control a control current individually for controlling each of the electric gas valves based on a measurement from the respective temperature sensor so that the temperature of each cooking zone and/or group is individually adjustable.

In some embodiments, the gas valve is an electric gas valve.

The electric gas valve comprises:
a solenoid,
a ferromagnetic axial rod, located within an effective range of the solenoid, and
a valve membrane, connected to the ferromagnetic axial rod, and
a spring, connected to the valve membrane and configured to keep the solenoid proportional gas valve sealed when a control current of the solenoid is zero.

The solenoid may be configured to generate an electromagnetic force to the ferromagnetic axial rod, the electromagnetic force is proportional to the control current and the valve membrane moves linearly based on a resultant of the electromagnetic force, spring force and a gas pressure on the valve membrane.

The control module may be configured to control the control current based on the control input and/or measurement from at least one temperature sensor.

In some embodiments, the user interface comprises a secondary device wirelessly connecting to the control module.

In other embodiments, the user interface comprises a control panel configured on the gas grill.

The present disclosure relates to a control method for a gas grill. The control method comprising:
grouping of at least two of a plurality of cooking zones of the gas grill to a cooking group, and
controlling heating modules corresponding to the cooking group based on a control input.

Various embodiments may implement the following features:

The step of controlling the heating modules corresponding to the cooking group based on the control input comprises controlling the heating modules corresponding to the cooking group based on a control loop indicated by the control input.

The step of controlling the heating modules corresponding to the cooking group based on the control input comprises:
determining, based on the control input, at least one indirect heating zone from the cooking zones of the cooking group and at least one direct heating zone from the cooking zones of the cooking group, and
controlling at least one temperature of the at least one indirect heating zone by controlling the heating module corresponding to the at least one direct heating zone based on a control loop indicated by the control input.

The control method further comprises turning off the heating module corresponding to the at least one indirect heating zone.

The at least two of the plurality of cooking zones may be grouped as the cooking group based on a group pattern.

The at least one indirect heating zone and the at least one direct heating zone may be determined based on a cooking pattern.

The control method further comprises receiving, from a user interface, the control input.

The control input indicates at least one of the group pattern or the cooking pattern.

The present disclosure provides the gas grill with the grouping function and control method thereof. By grouping multiple cooking zones into a cooking group, the user is able to control the gas grill at ease. For example, the grouped cooking zones in the cooking group may be controlled by the same control loop. Furthermore, an indirect cooking function may be realized by determining direct (active) heating zone(s) and indirect (inactive) heating zone(s) in the cooking group. Accordingly, the user is able to choose appropriate cooking methods for different recipes or amount/size of ingredients. In addition, the electric gas valve may be utilized in the heating module and the temperature (e.g. fire) of each cooking zone can be controlled more precisely.

The exemplary embodiments disclosed herein are directed to providing features that will become readily apparent by reference to the following description when taken in conjunction with the accompany drawings. In accordance with various embodiments, exemplary systems, methods and devices are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The subject matter of the present application will be explained in more detail in the following text with reference to preferred exemplary embodiments which are illustrated in the attached drawings, in which:

FIG. 5 shows a schematic diagram of an indirect cooking group according to an embodiment of the present disclosure.

The reference symbols used in the drawings, and their primary meanings, are listed in summary form in the list of designations. In principle, identical parts are provided with the same reference symbols in the figures.

DETAILED DESCRIPTION

Figure 1:
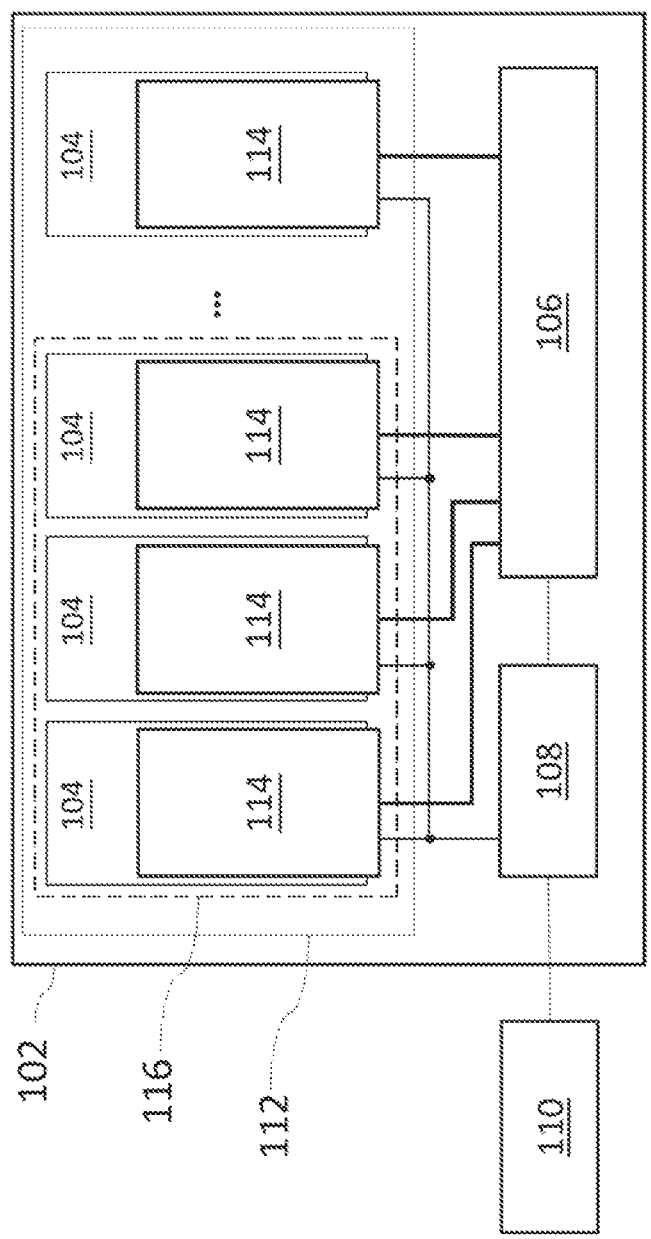
FIG. 1 shows a schematic diagram of a gas grill according to an embodiment of the present disclosure.

FIG. 1 shows a schematic diagram of a gas grill according to an embodiment of the present disclosure. In FIG. 1, the gas grill comprises a housing 102, a plurality of cooking zones 104, a gas supply module 106, a control module 108 and a user interface 110. The housing 102 defines a cooking chamber 112 in which the cooking zones 104 reside. Each of the cooking zones 104 corresponds to and/or comprises at least one heating module 114. For example, each of the cooking zones 104 may be a space on top of one heating module 114 in the cooking chamber 112. The gas supply module 106 is configured to provide gas to the heating modules 114. The control module 108 is configured to control the gas supply module 106 and the heating modules 114 based on a control input received from the user interface 110. The user interface 110 may be implemented in various ways. In an embodiment, the user interface 110 comprises a control panel configured on the housing 102. In another embodiment, the user interface 110 comprises a secondary device (e.g. a tablet, a remote controller or a mobile device). For example, the secondary device may be a smart phone operating an application capable of generating the control input. In an embodiment, the user interface 110 transmits the control input to the control module 108 by wireless communications (e.g. Bluetooth®, WIFI, ZigBee, internet, or the like). In an embodiment, the gas grill further comprises at least one temperature sensor (not shown in FIG. 1) for each of the cooking zones 104. For example, the cooking zone may comprise a cooking temperature sensor for sensing a temperature of the cooking zone. In an embodiment, the cooking zone may comprise a food temperature sensor with a probe for sensing a temperature inside of food being grilled.

In an embodiment, the control module 108 electrically connects to the sensors (e.g. cooking temperature sensor and/or food temperature sensor) of each cooking zone and collects, processes, computes, stores sensing results of the sensors.

In an embodiment, the user interface 110 displays temperature of each of cooking zones 104.

In an embodiment, the gas supply module 106 comprises gas pipes, pipe connectors, gas distributors, a pressure reducing valve and a gas stock sensor.

In an embodiment, the gas grill comprises heat deflectors (not shown in FIG. 1) between cooking zones 104 configured to shield radiation heat emitted by adjacent cooking zones 104.

In an embodiment, the gas grill comprises an illumination module (not shown in FIG. 1). The illumination module may be realized by light emitting diode (LED) unit(s) and/or Halogen light unit(s). For example, the gas grill may comprise LEDs for illuminating the user interface 110 configured on the housing 102 and may further comprise Halogen lights for respective cooking zones 104.

In an embodiment, the gas grill comprises a power module (not shown in FIG. 1) configured to provide power to, e.g., the control module 108, the illumination module and/or the user interface 110.

Figure 2:
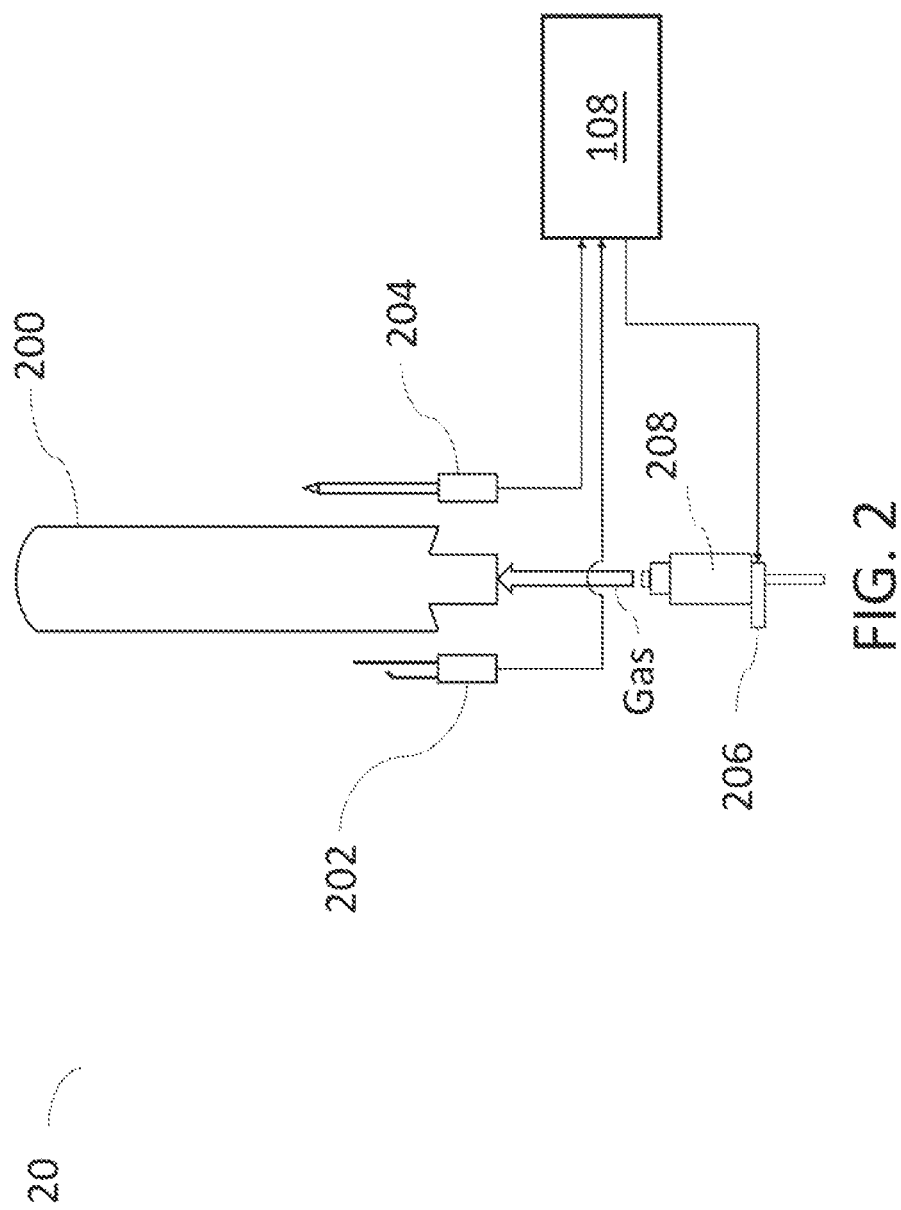
FIG. 2 shows a schematic diagram of a heating module according to an embodiment of the present disclosure.

FIG. 2 shows a schematic diagram of a heating module 20 according to an embodiment of the present disclosure. In FIG. 2, the heating comprises a burner 200, an ignitor 202 (e.g. with an ionic flame detector (IFD)), a temperature sensor 204, an ignition switch 206 and a gas valve 208. The ignitor 202, the ignition switch 206 and the temperature sensor 204 are coupled to (and e.g. controlled by) the control module 108.

In an embodiment, the gas valve 208 is a traditional manual gas valve, e.g., a mechanical valve.

In an embodiment, the gas valve 208 is an electric gas valve controlled by the control module 108. More specifically, the control module 108 controls an outlet pressure of the electric gas valve via controlling a control current of the electric gas valve. In an embodiment, the outlet pressure of the electric gas valve is linearly proportional to the control current.

Figure 3:
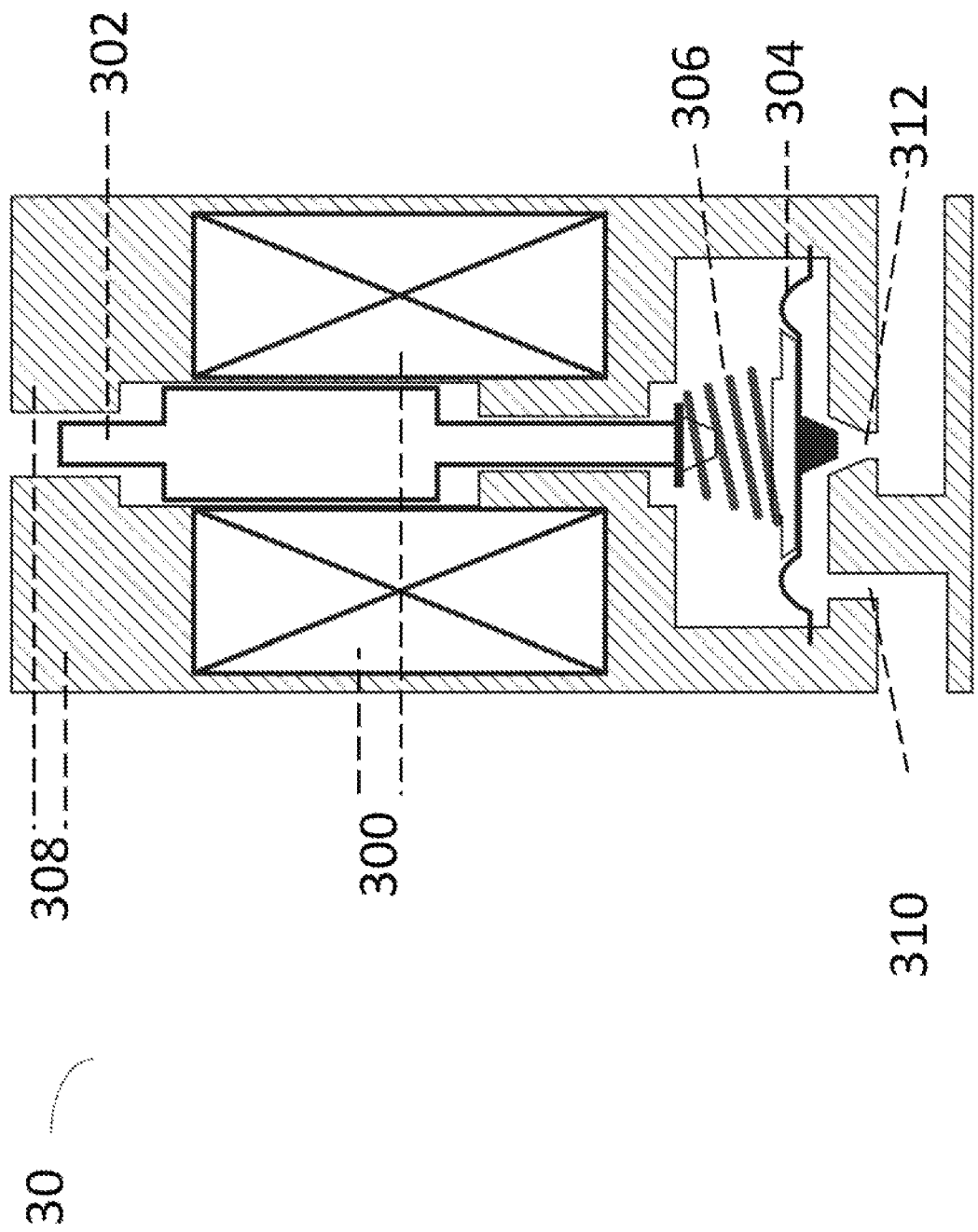
FIG. 3 shows a schematic diagram of a cross section view of a solenoid valve according to an embodiment of the present disclosure.

In an embodiment, the electric gas valve may be a solenoid proportional gas valve, comprising a solenoid, a ferromagnetic axial rod, a valve membrane and a spring. FIG. 3 shows a schematic diagram of a cross section view of a solenoid proportional gas valve 30 according to an embodiment of the present disclosure. In FIG. 3, the solenoid proportional gas valve 30 comprises a solenoid 300, a ferromagnetic axial rod 302, a valve membrane 304, a spring 306 and a solid body 308. The solenoid proportional gas valve 30 is configured to control the gas from a gas inlet 310 (e.g. connected to the gas supply module 106) to a gas outlet 312. The ferromagnetic axial rod 302 is located within an effective range of the solenoid 300 (e.g. a coil). The valve membrane 304 is connected to the ferromagnetic axial rod 302. The spring 306 is connected to the valve membrane 304 and configured to keep the gas outlet 312 of the solenoid proportional gas valve 30 sealed when the control current of the solenoid 300 is zero. Based on the control current, the solenoid 300 generates electromagnetic force on the ferromagnetic axial rod 302, so as to adjust the outlet pressure at the gas outlet 312 of the solenoid proportional gas valve 30. Because the solenoid proportional gas valve 30 is directly controlled by the control module 108 based on signals of a respective temperature sensor, automatic and real time temperature control as well as a fully automated cooking process are enabled.

In a steady state in the solenoid proportional gas valve 30, force of pressure of the gas on the valve core (e.g. the valve membrane 304, the ferromagnetic axial rod 302 and the spring 306) is equal to a combination of the electromagnetic force from the solenoid 300 and the force provided by the spring 306, wherein the electromagnetic force is (linearly) proportional to the control current driving the solenoid 300. Under such condition, compared to a traditional manual gas valve which adjusts the flow cross-sectional area, the solenoid proportional gas valve 30 adjusts the outlet pressure directly and proportionally (e.g. linearly), which leads to a more precise and proportional (e.g. linear) gas flow control. Additionally, the pressure fluctuation from the gas supply system will be drastic reduced. In addition, controlling or adjusting the opening degree of the solenoid proportional gas valve 30 does not lead to any movement of control elements (e.g. mechanical knob). Thus, the solenoid proportional gas valve 30 may be controlled by multiple terminals, both local and remote terminals.

Compared to the mechanical valve, the electric valve (e.g. solenoid proportional gas valve) may not need mechanical connections to the control module 108. Under such condition, a construction design of the gas grill may be much easier and flexible and the whole construction of the gas grill may be more compact.

In an embodiment, the user interface 110 comprises an encoder for each of cooking zones 104. The encoder is electrically connected to the control module 108 and controls an opening degree (e.g. control current) of the corresponding electronic gas valve.

In an embodiment, the gas grill of the present disclosure provides a function of grouping multiple cooking zones 104 into a cooking group (e.g. cooking group 116 shown in FIG. 1), so as to provide various cooking functions in a convenient manner. Depending on different recipes or amount/size of ingredients, the user may group the cooking zones 104 in different ways for enabling the cooking area to fit cooking requirements best. For example, the user may choose a group pattern via the user interface 110 and control module 108 groups cooking zones 104 into the cooking group based on the group pattern indicated by the control input received from the user interface 110.

In an embodiment, the cooking group is defined with a variable in the user interface 110 (e.g. software or application).

In an embodiment, the user may create multiple cooking groups via the user interface 110 and the cooking groups can be flexible combined, detached or regrouped at any time according to user's operations on the user interface 110.

In an embodiment of multiple cooking groups, the temperature of each of cooking group is individually adjustable.

In an embodiment of multiple cooking groups, the user interface 110 may display an average temperature of each of the cooking groups.

In an embodiment, the user interface 110 may display temperatures of cooking zones 104 in the cooking group.

In an embodiment, single cooking group has only one control loop, e.g., for active heating modules 114 in the cooking group.

In an embodiment, multiple cooking zones 104 may be grouped into a direct cooking group. In this embodiment, the heating modules 114 in the direct cooking group are controlled by the same control loop indicated by the user input. For example, the user may select a direct cooking function and a group pattern via the user interface 110 and the control module 108 receives the control inputs from the user interface 110 and groups cooking zones 104 as the direct cooking group based on the group pattern. In the direct cooking group, all the heating modules 114 are active and controlled by the same control loop. Note that, the control loop may be set by the user via the user interface 110 and indicated by the control input. Under such a condition, a cooking area containing multiple cooking zones 104 can be acquired. For example, when the size/amount of the ingredients is greater than single cooking zone or the ingredients in multiple cooking zones 104 have similar cooking requirements, the user may group multiple cooking zones 104 via the user interface 110 into the direct cooking group and determines the control loop of controlling all heating modules 114 in the direct cooking group via the user interface 110. As a result, the user does not need to separately control the temperature or the cooking process in each of the cooking zones 104 (ease of use).

In an embodiment, multiple cooking zones 104 may be grouped into an indirect cooking group, for enabling an indirect cooking function, which refers to a pure convection cooking mode without or almost no direct (radiation) heat. In the indirect cooking group, each of cooking zones 104 is determined as a direct (active) heating zone or an indirect (inactive) heating zone, wherein the heating module(s) 114 corresponding to the direct heating zone is(are) turned on and the heating module(s) 114 corresponding to the indirect heating zone is(are) turned off during the cooking process. For example, the heating module(s) 114 corresponding to the direct heating zone is(are) controlled according to the control loop indicated by the control input. In an embodiment, the cooking area of the indirect cooking group is a combination of the indirect heating zone(s). Since the heating module 114 in the cooking area (i.e. indirect heating zone(s)) is(are) shut off (e.g. turned off or inactive), the temperature of the cooking area (i.e. indirect heating zone(s)) is adjusted by controlling the heating module 114 of the direct heating zone(s). Accordingly, the indirect cooking function is realized in the gas grill. The user is able to use the indirect cooking based on different recipes or amount/size of the ingredients.

In an embodiment, the direct heating zone (or direct cooking zone) is the cooking zone 104 whose heating module(s) 114 is active.

In an embodiment, the indirect heating zone (or direct cooking zone) is the cooking zone 104 whose heating module(s) 114 is inactive.

In an embodiment, the user may select the indirect cooking function and a group pattern via the user interface 110. When selecting the indirect cooking function, the user may further select a cooking pattern of indicating direct heating zone(s) and indirect heating zone(s) in the indirect cooking group. Based on the group pattern and the cooking pattern (e.g. indicated by the control input received from the user interface 110), the control module 108 groups corresponding cooking zones 104 as the indirect cooking group and determines the direct heating zone(s) and the indirect heating zone(s) in the indirect cooking group.

In an embodiment, radiation heat of the direct heating zone(s) may be shielded by heat deflector(s) between the direct heating zone and the indirect heating zone.

Figure 4A:
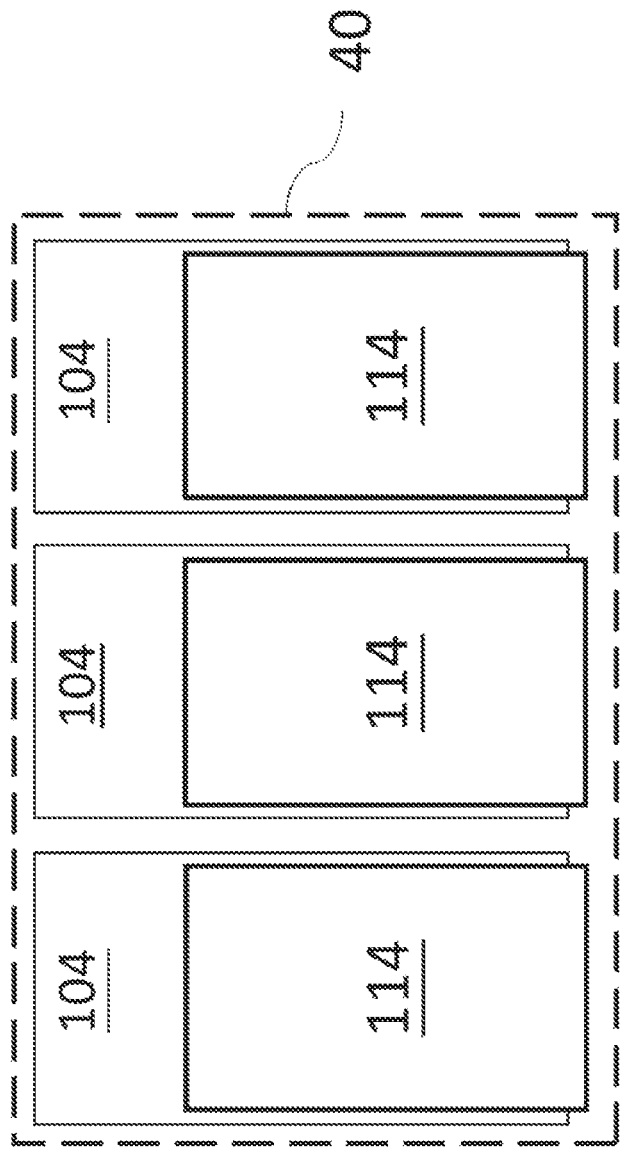
FIG. 4A shows a schematic diagram of a top view of a cooking group according to an embodiment of the present disclosure.
Figure 4B:
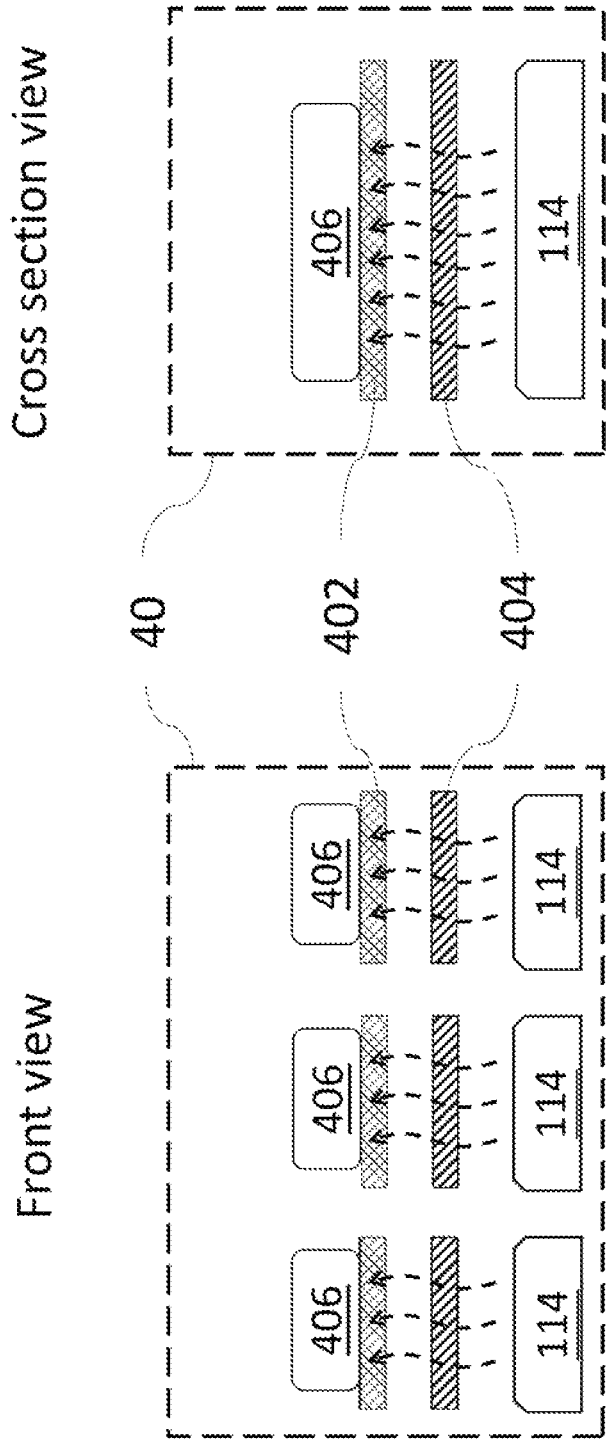
FIG. 4B shows a schematic diagram of a front view and a cross section view of a cooking group according to an embodiment of the present disclosure.

FIGS. 4A and 4B show schematic diagrams of a top view, a front view and a cross sectional view of a cooking group 40 according to an embodiment of the present disclosure. In FIGS. 4A and 4B, the cooking group 40 comprises 3 cooking zones 104. Note that, the number of cooking zones 104 may vary based on the group pattern received from the user interface 110. In addition, there are a grill grate 402 and a flame tamer 404 in each of cooking zones 104. Note that, the cooking group 40 shown in FIGS. 4A and 4B is a direct cooking group. The food 406 in each cooking zone 104 is directly grilled by the corresponding heating module 114.

Figure 4C:
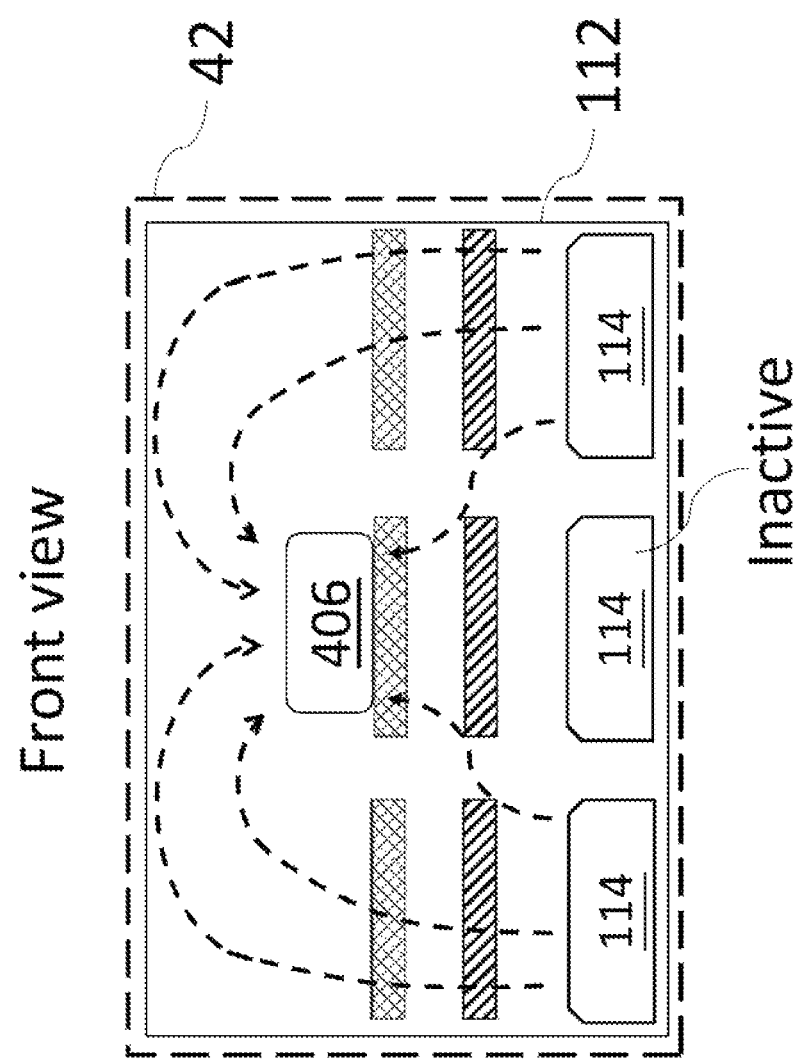
FIG. 4C shows a schematic diagram of a front view of a cooking group according to an embodiment of the present disclosure.

FIG. 4C shows a schematic diagram of a front view of a cooking group 42 according to an embodiment of the present disclosure. In FIG. 4C, the cooking group 42 is the indirect cooking group, wherein the left and right cooking zones 104 are the direct heating zones and the middle cooking zone 104 is the indirect heating zone. That is, the heating module 114 in the middle is inactive. Under such condition, the food 406 in the indirect heating zone is cooked by heat generated by the heating modules 114 of the direct heating zones (i.e. indirect cooking).

Figure 4D:
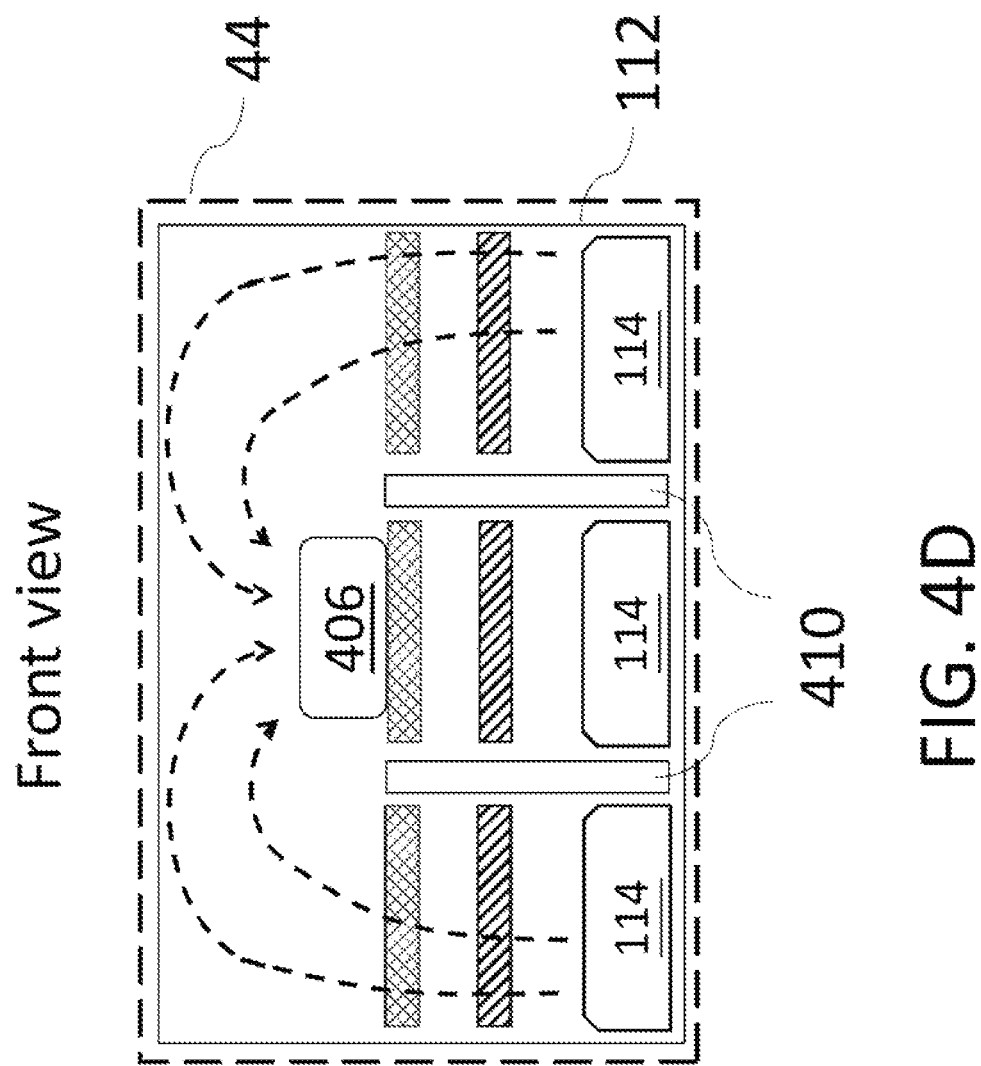
FIG. 4D shows a schematic diagram of a front view of a cooking group according to an embodiment of the present disclosure.

FIG. 4D shows a schematic diagram of a front view of a cooking group 44 according to an embodiment of the present disclosure. In FIG. 4D, the cooking group 44 is also an indirect cooking group, wherein the left and right cooking zones 104 are direct heating zones and the middle cooking zone 104 is an indirect heating zone. In this embodiment, the heat deflectors are configured between the cooking zones 104 and shield radiation heat emitted by the direct heating zones. Accordingly, the food 406 in the indirect heating zone is cooked purely by convection heat from the direct heating zones.

FIG. 5 shows a schematic diagram of an indirect cooking group 50 according to an embodiment of the present disclosure. In FIG. 5, the selected group pattern comprises 3 cooking zones 104 and the cooking pattern indicates the left and right cooking zones 104 are the direct (active) heating zones 104A and the middle cooking zone 104 is the indirect (inactive) heating zone 104B. In other words, the indirect cooking area of the indirect cooking group 50 is the middle indirect heating zone 104B.

Figure 6:
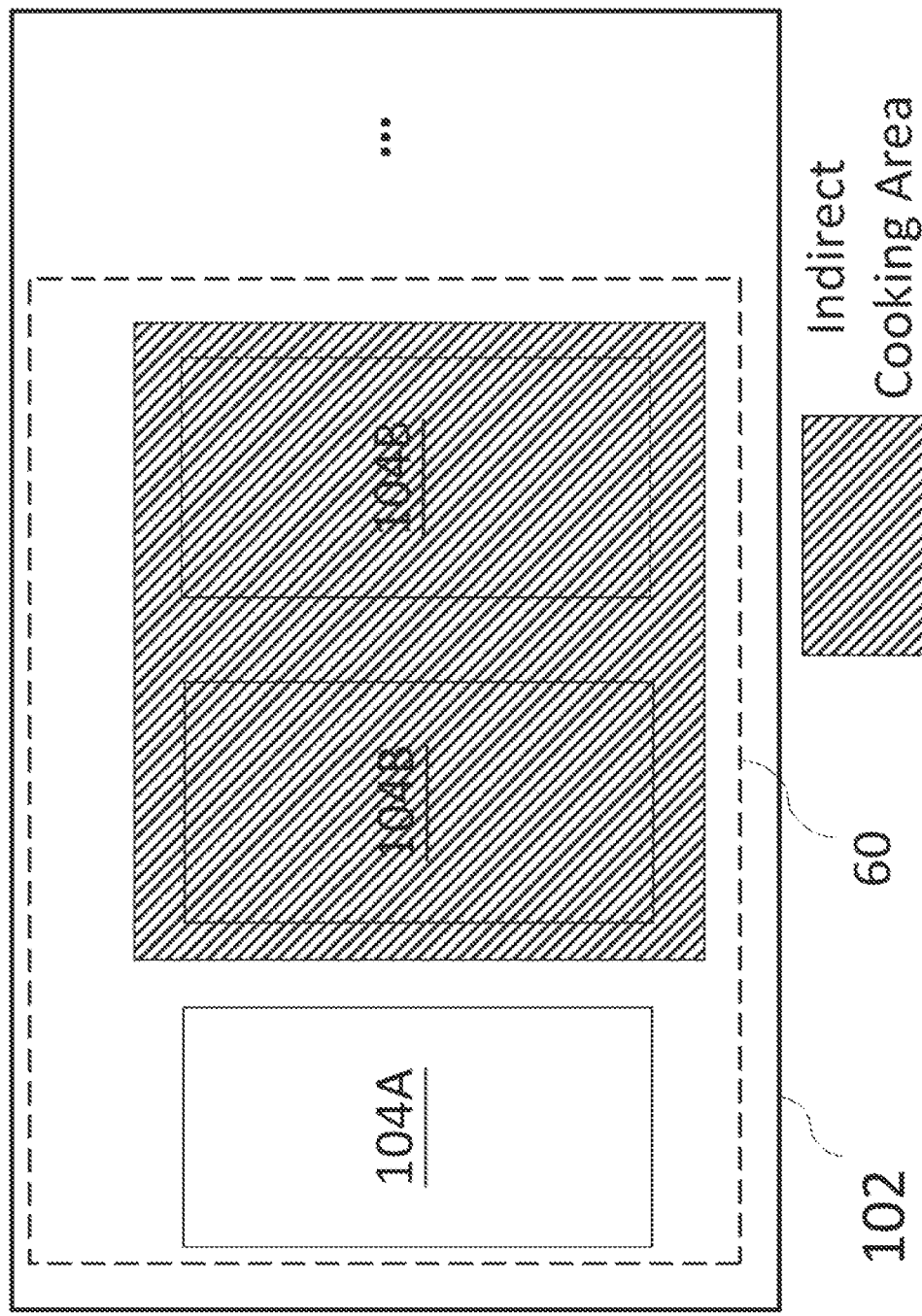
FIG. 6 shows a schematic diagram of an indirect cooking group according to an embodiment of the present disclosure.

FIG. 6 shows a schematic diagram of an indirect cooking group 60 according to an embodiment of the present disclosure. In FIG. 6, the selected group pattern comprises 3 cooking zones 104 and the cooking pattern indicates the left cooking zone 104 is the direct (active) heating zone 104A and the middle and right cooking zones 104 are the indirect (inactive) heating zones 104B. Thus, the indirect cooking area of the indirect cooking group 60 comprises the middle and right indirect heating zones 104B.

Figure 7:
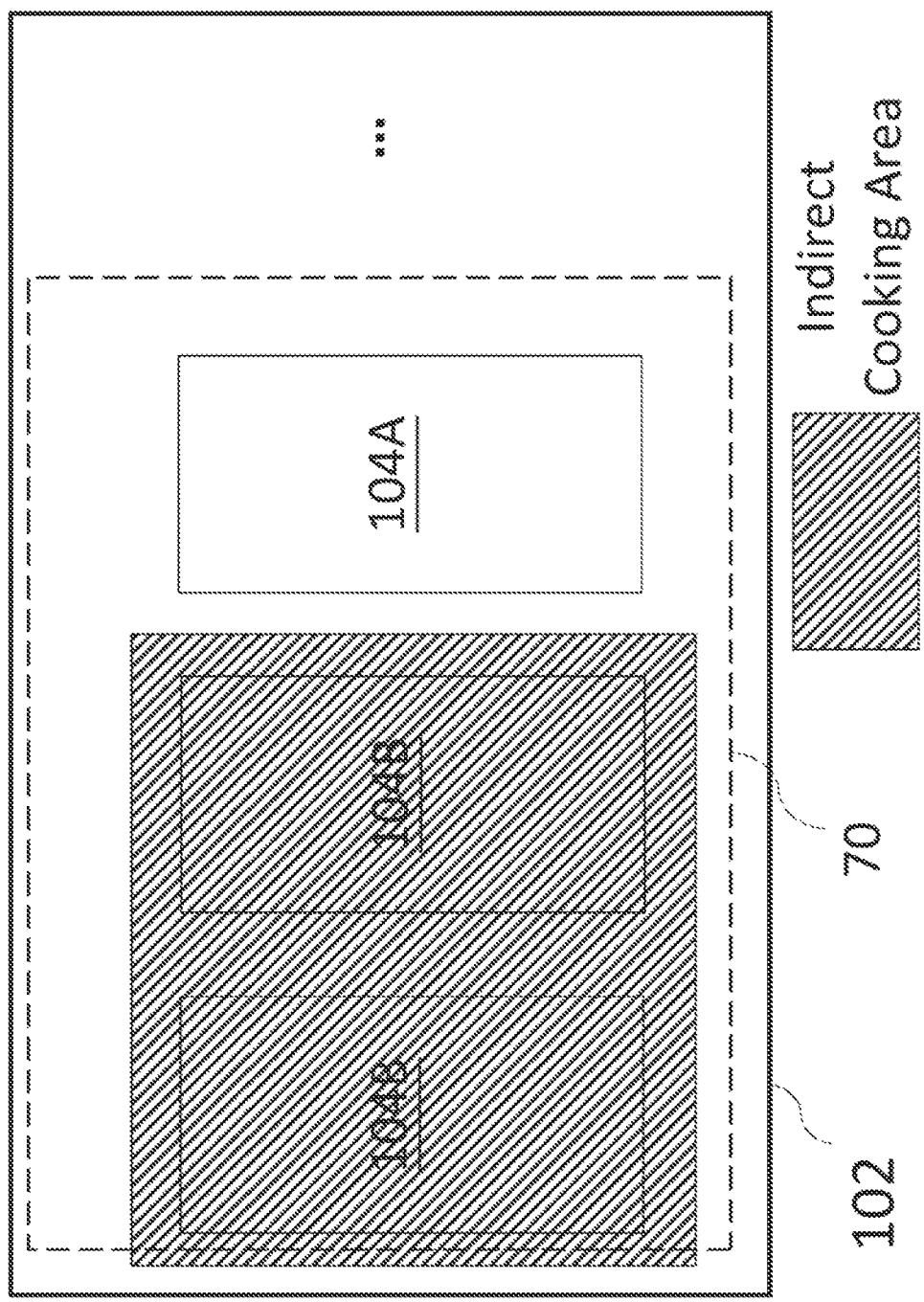
FIG. 7 shows a schematic diagram of an indirect cooking group according to an embodiment of the present disclosure.

FIG. 7 shows a schematic diagram of an indirect cooking group 70 according to an embodiment of the present disclosure. In FIG. 7, the selected group pattern comprises 3 cooking zones 104 and the cooking pattern indicates that the right cooking zone 104 is the direct (active) heating zone 104A and that the middle and left cooking zones 104 are the indirect (inactive) heating zones 1046. Therefore, the indirect cooking area of the indirect cooking group 70 includes the middle and left indirect heating zones 104B.

Figure 8:
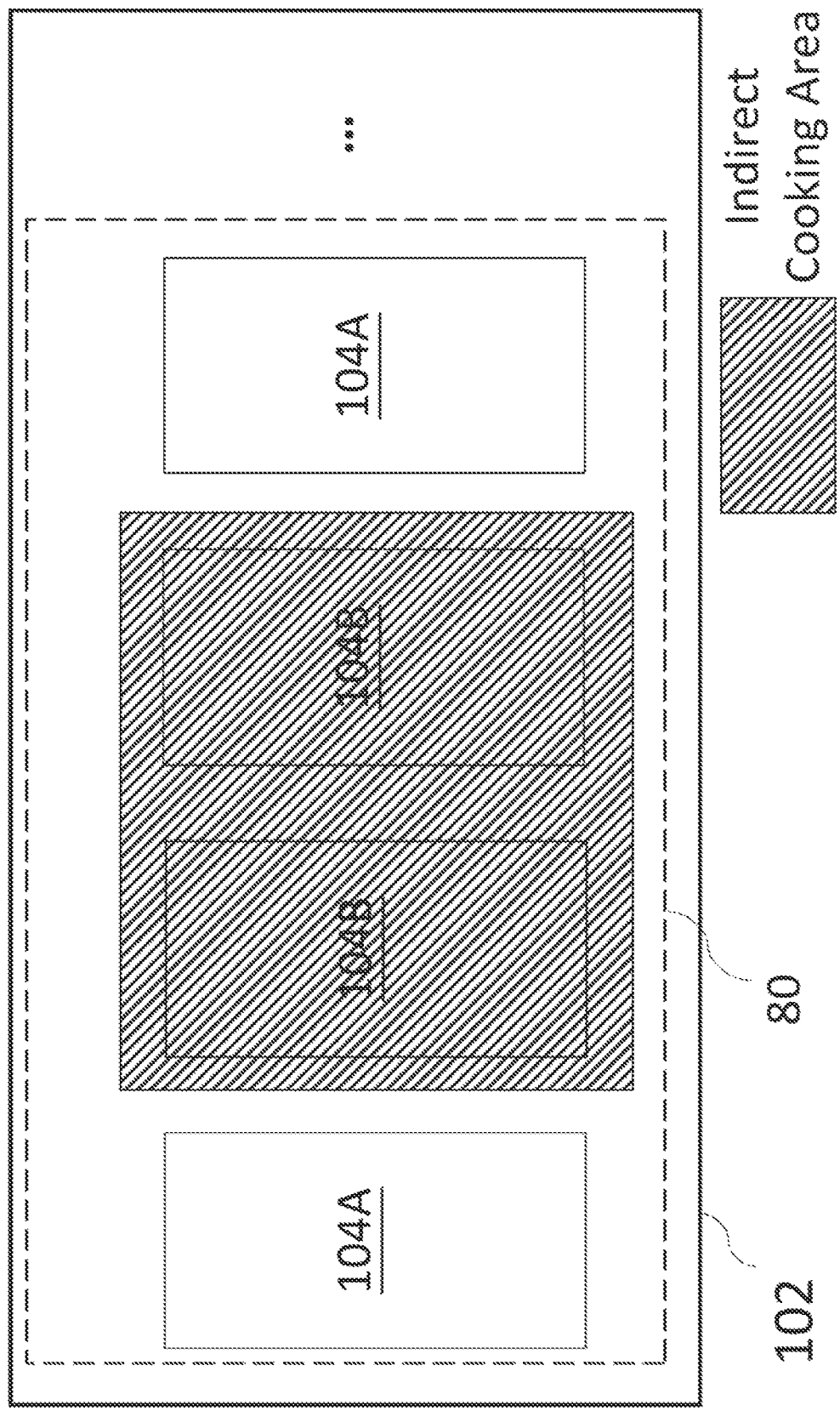
FIG. 8 shows a schematic diagram of an indirect cooking group according to an embodiment of the present disclosure.

FIG. 8 shows a schematic diagram of an indirect cooking group 80 according to an embodiment of the present disclosure. In FIG. 8, the selected group pattern comprises 4 cooking zones 104 and the cooking pattern indicates the left and right cooking zones 104 being direct (active) heating zones 104A and the two cooking zones 104 in the middle being indirect (inactive) heating zones 104B. Therefore, the indirect cooking area of the indirect cooking group 80 includes the two indirect heating zones 104B in the middle.

Figure 9:
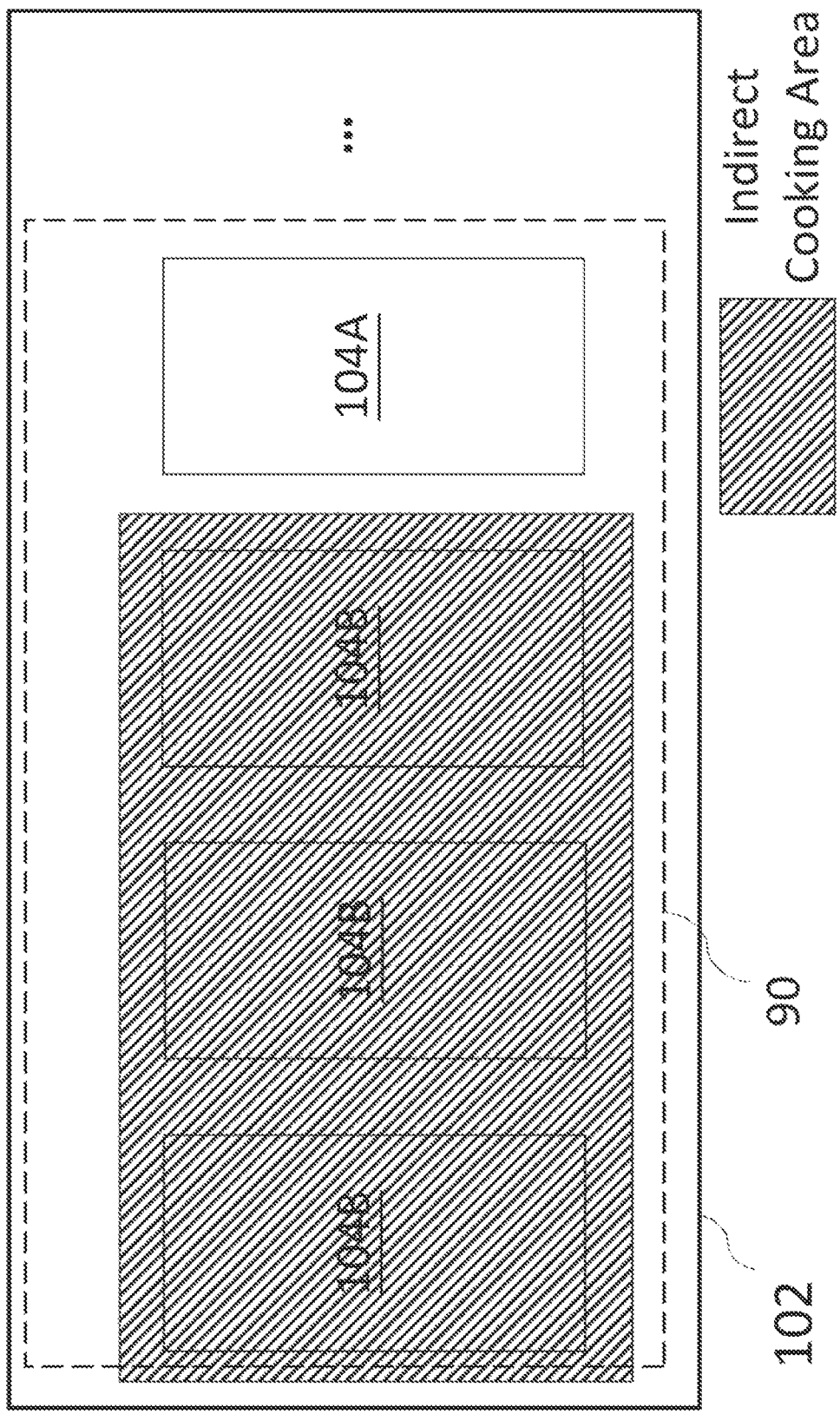
FIG. 9 shows a schematic diagram of an indirect cooking group according to an embodiment of the present disclosure.

FIG. 9 shows a schematic diagram of an indirect cooking group 90 according to an embodiment of the present disclosure. In FIG. 9, the selected group pattern comprises 4 cooking zones 104 and the cooking pattern indicates only the right cooking zone 104 is the direct (active) heating zone 104A and the remaining cooking zones 104 are the indirect (inactive) heating zones 104B. Therefore, the indirect cooking area of the indirect cooking group 90 includes the indirect heating zones 104B.

Figure 10:
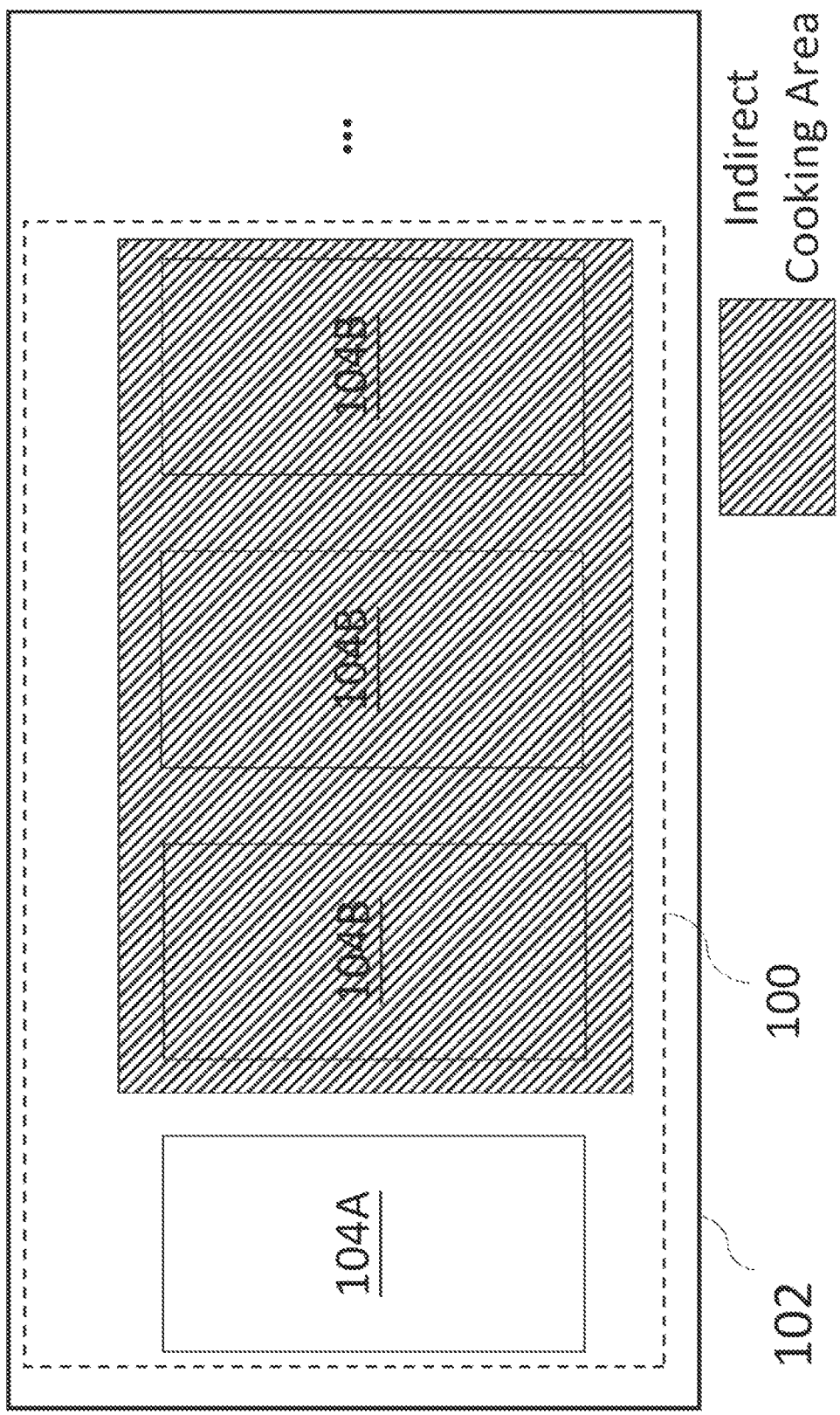
FIG. 10 shows a schematic diagram of an indirect cooking group according to an embodiment of the present disclosure.

FIG. 10 shows a schematic diagram of an indirect cooking group 100 according to an embodiment of the present disclosure. In FIG. 10, the selected group pattern comprises 4 cooking zones 104 and the cooking pattern indicates that only the left cooking zone 104 is the direct (active) heating zone 104A and the remaining cooking zones 104 are the indirect (inactive) heating zones 104B. Therefore, the indirect cooking area of the indirect cooking group 100 includes the indirect heating zones 104B.

The present disclosure provides the gas grill with the grouping function and the control method thereof. By grouping multiple cooking zones into the cooking group, the user is able to control the gas grill at ease. For example, the grouped cooking zones in the cooking group may be controlled by the same control loop (i.e. the direct cooking function). Furthermore, the indirect cooking function is realized by determining the direct heating zone(s) and the indirect heating zone(s) in the (indirect) cooking group. Accordingly, the user is able to choose appropriate cooking methods for different recipes or amount/size of the ingredients. In addition, the electric gas valve (e.g. the solenoid proportional gas valve) may be utilized in the heating module and the temperature (e.g. fire) of each cooking zone can be controlled more precisely.

The invention claimed is:

1. A gas grill, comprising:
a housing defining a cooking chamber,
a plurality of cooking zones in the cooking chamber, wherein each of the plurality of cooking zones is corresponding to at least one heating module,
a computer processor configured to provide gas to the at least one heating module of each of the plurality of cooking zones, and to control a gas supply module and the at least one heating module corresponding to each of the plurality of cooking zones based on a control input, and
a user interface configured to generate the control input, wherein the computer processor is further configured to:
group at least two of the plurality of cooking zones to a cooking group based on the control input, and
control the heating modules corresponding to the cooking group based on the control input;
wherein the computer processor controls the heating modules corresponding to the cooking group based on the control input by:
determining, based on the control input, at least one indirect heating zone from the cooking zones of the cooking group and at least one direct heating zone from the cooking zones of the cooking group, and
controlling at least one temperature of the at least one indirect heating zone by controlling the heating module corresponding to the at least one direct heating zone based on a control loop indicated by the control input.

2. The gas grill of claim 1, wherein the computer processor controls the heating modules corresponding to the cooking group based on the control input further by:
turning off the heating module corresponding to the at least one indirect heating zone.

3. The gas grill of claim 1, further comprising at least one heat deflector between the cooking zones of the cooking group, wherein the at least one heat deflector is configured to shield radiation heat from the at least one direct heating zone to the at least one indirect heating zone.

4. The gas grill of claim 1, wherein each of the at least one heating module corresponding to the plurality of cooking zones comprises at least one of a burner, a heat distributor, a grill grate, a gas nozzle, a temperature sensor, a flame sensor, an ignitor and an electrical gas valve located between the gas nozzle and gas supply module.

5. The gas grill of claim 4, wherein the gas valve is an electric valve and an outlet pressure of the electric gas valve is linearly proportional to a control current of controlling the electric gas valve.

6. The gas grill of claim 5, wherein the electric gas valve comprises:
a solenoid,
a ferromagnetic axial rod, located within an effective range of the solenoid, and a valve membrane, connected to the ferromagnetic axial rod, and a spring, connected to the valve membrane and configured to keep the solenoid proportional gas valve sealed when a control current of the solenoid is zero.

7. The gas grill of claim 6, wherein the solenoid is configured to generate an electromagnetic force to the ferromagnetic axial rod, the electromagnetic force is proportional to the control current and the valve membrane moves linearly based on a resultant of the electromagnetic force, spring force and a gas pressure on the valve membrane.

8. The gas grill of claim 5, wherein the computer processor is configured to control the control current based on the control input.

9. The gas grill of claim 1, wherein the user interface comprises a secondary device wirelessly connecting to the computer processor.

10. The gas grill of claim 1, wherein the user interface comprises a control panel configured on the gas grill.

11. A control method for a gas grill, comprising:

grouping at least two of a plurality of cooking zones of the gas grill to a cooking group based on a control input, and controlling heating modules corresponding to the cooking group based on a control input; wherein the step of controlling the heating modules corresponding to the cooking group based on the control input comprises:

determining, based on the control input, at least one indirect heating zone from the cooking zones of the cooking group and at least one direct heating zone from the cooking zones of the cooking group, controlling, based on the control input, at least one temperature of the at least one indirect heating zone by controlling heating module corresponding to the at least one direct heating zone, and turning off the heating module corresponding to the at least one indirect heating zone.

12. A control method for a gas grill, comprising:

grouping at least two of a plurality of cooking zones of the gas grill to a cooking group based on a control input, and controlling heating modules corresponding to the cooking group based on a control input; wherein the step of controlling the heating modules corresponding to the cooking group based on the control input comprises:

determining, based on the control input, at least one indirect heating zone from the cooking zones of the cooking group and at least one direct heating zone from the cooking zones of the cooking group, and controlling, based on the control input, at least one temperature of the at least one indirect heating zone by controlling heating module corresponding to the at least one direct heating zone.

* * * * *